(12) United States Patent
Nam (10) Patent No.: US 10,298,118 B1
(45) Date of Patent: May 21, 2019

(54) SYSTEMS AND METHODS FOR SELF-DRIVEN ACTIVE RECTIFICATION

(71) Applicant: Haier US Appliance Solutions, Inc., Wilmington, DE (US)

(72) Inventor: Isaac Nam, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 15/978,254

(22) Filed: May 14, 2018

(51) Int. Cl.
| | |
|---|---|
| H02M 7/219 | (2006.01) |
| H02M 1/42 | (2007.01) |
| H02M 7/217 | (2006.01) |
| H02M 1/00 | (2006.01) |

(52) U.S. Cl.
CPC ......... H02M 1/4233 (2013.01); H02M 7/217 (2013.01); *H02M 2001/0025* (2013.01)

(58) Field of Classification Search
CPC .. H02M 2001/0009; H02M 7/02; H02M 7/04; H02M 7/12; H02M 7/21; H02M 7/217; H02M 7/219; H02M 7/25
See application file for complete search history.

(56) References Cited

U.S. PATENT DOCUMENTS

| | | | |
|---|---|---|---|
| 5,510,972 A | 4/1996 | Wong | |
| 6,316,956 B1 * | 11/2001 | Oglesbee | H02J 7/0029 323/225 |
| 7,265,525 B2 | 9/2007 | Xu et al. | |
| 7,394,675 B2 * | 7/2008 | Hwang | H02H 7/1225 363/142 |
| 8,300,440 B2 | 10/2012 | Ho et al. | |
| 9,537,385 B2 * | 1/2017 | Pu | H02M 1/4225 |
| 2010/0277954 A1 * | 11/2010 | Charych | H02J 7/0016 363/21.1 |
| 2014/0369101 A1 * | 12/2014 | Nguyen | H02M 1/084 363/127 |
| 2015/0162822 A1 * | 6/2015 | Ho | H02M 1/4208 363/89 |

* cited by examiner

*Primary Examiner* — Gary L Laxton
(74) *Attorney, Agent, or Firm* — Dority & Manning, P.A.

(57) ABSTRACT

Systems and methods for providing self-driven active AC rectification are provided. In particular, a power conversion system for providing self-driven active AC rectification can be provided. The system can include an input for receiving AC power, a first capacitor and a second capacitor electrically connected in series. The first and second capacitors can also be electrically connected in parallel with a rectifier's load. The system can include a low-side switching element and a shunt resistor electrically connected between the rectifier's load and a system ground. The power conversion system can also include a low-side feedback control loop configured to obtain a low-side feedback signal based on a voltage across the shunt resistor and the low-side feedback control loop can be further configured to control the low-side switching element based, at least in part, on the low-side feedback signal.

19 Claims, 8 Drawing Sheets

SYSTEMS AND METHODS FOR SELF-DRIVEN ACTIVE RECTIFICATION

FIELD

The present disclosure relates generally to systems and methods for AC rectification, and more particularly to power converters for providing self-driven active rectification and methods for providing self-driven active rectification.

BACKGROUND

Electrical devices and electrical systems often require the rectification of an alternating current (AC) input. Rectifier circuits can be used to supply electrical systems or electrical devices, such as appliances, with suitable rectified voltage and current. Rectification of an AC input is important in many common applications such as in industrial and consumer electronics and appliances, including for example, refrigerators with linear compressors, induction cooking appliances, HVAC compressors and heating elements.

In many applications, a common rectifier circuit for AC input rectification can utilize diodes and diode bridges for passive rectification. Although the use and implementation of diodes for passive rectification in diode bridge rectification circuits can be accomplished without the use of complex circuit topologies, such as in the half-bridge and full-bridge configurations, diode bridge rectification circuits or diode bridge rectifiers have disadvantages, namely diode conduction losses. Diodes can cause significant conduction losses in diode bridge rectifier circuits since forward voltage drop of a diode can be relatively high. For example, the conduction losses caused by diodes can result in poor power transfer efficiency percentage for a lower power application.

Active rectification can be used to reduce conduction losses and improve efficiency in AC rectification. Some active rectifiers provide improved efficiency over passive diode bridge rectifiers by reducing resistive losses in the rectifier by replacing diodes with MOSFETs. Conduction losses can be reduced because MOSFETs can have a low $R_{DS}$ on-resistance which results in lower conduction losses in a rectifier circuit. However, some systems and methods of active rectification require the use of microcontrollers to drive MOSFETs which can be undesirable because of increased cost or additional control loop.

Accordingly, systems and methods for providing self-driven active rectification utilizing streamlined and cost effective circuit topologies and control methods, which deliver reduced conduction losses, would be useful and welcomed.

BRIEF DESCRIPTION

Aspects and advantages of embodiments of the present disclosure will be set forth in part in the following description, or may be learned from the description, or may be learned through practice of the embodiments.

One example aspect of the present disclosure is directed to a power conversion system for providing self-driven active AC rectification. The power conversion system includes an input for receiving AC power and a first capacitor and a second capacitor electrically connected in series. The first and second capacitors are electrically connected in parallel with a load. The power conversion system can include a low-side switching element and a shunt resistor electrically connected between the load and a power conversion system ground. The power conversion system can also include a low-side feedback control loop configured to provide a low-side feedback signal based, at least in part, on a voltage across the shunt resistor. The low-side feedback control loop can be further configured to control the low-side switching element based, at least in part, on the low-side feedback signal.

Another example aspect of the present disclosure is directed to a method for providing self-driven active rectification of AC voltage and AC current. The method includes measuring a voltage across a shunt resistor, said shunt resistor being electrically connected between a rectifier's load and a ground. The method can also include determining a feedback signal based, at least in part, on a comparison of the voltage measured across the shunt resistor to a threshold. The method can also include generating a control signal when the feedback signal is greater than the threshold and providing the control signal to a gate driver. The gate driver can generate a gate drive signal based, at least in part, on the control signal. The method can also include controlling one or more low-side switching elements based, at least in part, on the gate drive signal.

Another example aspect of the present disclosure is directed to a self-driven active rectifier circuit for a power converter. The self-driven active rectifier circuit includes an input configured for receiving AC power and a first capacitor and a second capacitor electrically connected in series. The self-driven active rectifier circuit can also include a high-side diode, a low-side switching element and a shunt resistor electrically connected between a load and a rectifier circuit ground. The self-driven active rectifier circuit can include a low-side feedback control loop configured to provide a low-side feedback signal based, at least in part, on a voltage across the shunt resistor. The low-side feedback control loop can be configured to control the low-side switching element based, at least in part, on the low-side feedback signal.

Variations and modifications can be made to these example aspects of the present disclosure. These and other features, aspects and advantages of various embodiments will become better understood with reference to the following description and appended claims. The accompanying drawings, which are incorporated in and constitute a part of this specification, illustrate certain example embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as may come within the scope of the appended claims and their equivalents.

Example aspects of the present disclosure are directed to systems and methods for AC rectification, and more particularly systems and methods for providing self-driven active rectification. Certain example aspects of the present disclosure are directed to an AC rectifier for providing self-driven active rectification and circuit topologies therefore. The power converter can include one or more switching elements, such as MOSFETs (e.g., silicon carbide MOSFETs or gallium nitride MOSFETs), or one or more switching elements used in combination with diodes to reduce conduction losses without a high-side gate driver and increase efficiency further compared to a passive AC rectifier utilizing diodes only. Alternatively, the switching elements can be other high performing semiconductor devices, such as IGBTs if each IGBT's collector to emitter saturation voltage is low compared to forward voltage drop of each diode in a diode bridge rectifier. On account of the low on-voltage drop of a transistor (e.g., MOSFETs), the use of high performance semiconductor devices as switching devices for self-driven active rectification can reduce conduction losses that occur during rectification. In this way, systems and methods according to example aspects of the present disclosure can have a technical effect of reducing conduction losses during AC rectification.

Example aspects of the present disclosure are directed to systems and methods for providing self-driven active rectification. Certain example aspects of the present disclosure are directed at utilizing control feedback outputs to control, drive or operate one or more switching devices, such as MOSFETs. More specifically, gate driver signals used to turn the one or more MOSFETs on or off are based, at least in part, on one or more control feedback outputs. In such a configuration at least one of the control feedback outputs can be used to generate a gate driver signal (i.e., a control signal). In this configuration one of the control feedback outputs is based, at least in part, on a voltage measured across a shunt resistor. The shunt resistor can be referenced to the power converter or rectifier ground and, in some instances, the shunt resistor can also be referenced to the load. The voltage drop measured across the shunt resistor can correspond to the rectified current at the load and correspond to the current through one or more of the switching elements. The electrical resistance of the shunt resistor is selected or determined by the power converter designer, based upon the desired rectified current levels at the load (i.e., the load power requirements) or the desired ripples of rectified current. The voltage drop measured across the shunt resistor can be used as a control feedback output and the control feedback output can be used to generate a gate signal to control the one or more switching elements (e.g., MOSFETs) and cause the power converter to provide the desired rectified voltage and/or current at the load. In this way, the rectifier circuit can have a technical effect of providing AC rectification with reduced conduction losses as a result of the use of MOSFETs.

A power converter according to example aspects of the present disclosure can include a half-bridge configuration for providing self-driven active rectification. The power converter can be used to convert an AC input to a rectified output such that the rectified voltage and rectified current can be provided to a load. The power converter can include one or more high-side switching elements and/or one or more low-side switching elements. The one or more low-side switching elements can be MOSFETs and the one or more high-side switching elements can be MOSFETs. The one or more low side switching elements can be controlled (i.e., turned on and turned off) based on a first control feedback output. The one or more high-side switching elements can be controlled (i.e., turned on and turned off) based on a second control feedback output. As used herein "low-side switching element" refers to the switching element that is referenced to the power converter ground. As used herein "high-side switching element" refers to the switching element that is referenced to the load and is floating above the low-side switching element. The high-side switching element can also be referenced to the AC input and the low-side switching element.

Another example aspect of the present disclosure is directed to systems and methods for operating an AC to DC power converter to provide self-driven active rectification using controlled low-side switches, such as MOSFETs, and a diode positioned on the high-side of the power converter circuit topology. This type of circuit topology can be referred to as a hybrid self-driven active rectifier. Use of a diode on the high-side of the circuit topology can provide a benefit of a more cost effective or less complex circuit topology. The power converter can include one or more low-side MOSFETs and a shunt resistor (e.g., $R_{SENSE}$) that is in electrical communication between the load and power converter ground such that the voltage drop measured across the shunt resistor corresponds to the rectified current flowing through the load. The method can include measuring the voltage drop across $R_{SENSE}$, for example by using a control feedback circuit, and determining a control feedback output based, at least in part, on the voltage drop measured across $R_{SENSE}$. The method can also include generating a gate drive signal based, at least in part, on the feedback output and utilizing the gate drive signal to control, drive or operate (i.e., turn on and turn off) the one or more low-side MOSFETs. The gate drive signal can be used to control or operate the one or more low-side MOSFETs in such a manner as to cause the rectifier to provide rectified voltage and current signals to the load. In this way, self-driven AC rectification can be obtained with reduced conduction losses as a result of the use of MOSFETs.

According to further example embodiments of the present disclosure, a method for obtaining self-driven active rectification can include the feedback output being provided to one or more gate driver circuits. The gate driver circuits can be used to determine an on-time and/or off-time to drive the one or more switching elements (e.g., MOSFETs) to provide desired levels of rectified voltage and current to the load. For instance, a gate driver circuit can provide a gate drive signal (i.e., a control signal) to a low-side MOSFET in the power converter to control the operation of the low-side MOSFET (i.e. causing the MOSFET to turn on or turn off). The gate drive signal can be based on a feedback output generated by a control feedback circuit (e.g., a comparator circuit) which is determined by measuring a voltage drop (i.e., $V_f(t)$) across a shunt resistor (e.g., $R_{SENSE}$) and comparing $V_f(t)$ to a threshold voltage ($V_Y$). Threshold voltage ($V_Y$) can be a predetermined threshold based on the desired rectified current level at the load. Threshold voltage ($V_Y$) can also be a threshold or boundary based upon a hysteresis tolerance or hysteresis window associated with noise related to the AC line input or the load. The control feedback circuit (e.g., a comparator circuit) can generate a feedback control signal based, at least in part, on a comparison of $V_f(t)$ to $V_Y$. If $V_f(t)$ is greater than $V_Y$ (i.e., $V_f(t) > V_Y$) the comparator circuit can generate an output (i.e., a feedback control signal) which can be provided to and utilized by a gate driver circuit to generate a gate drive signal to turn on the low-side MOSFET. If $V_f(t)$ is less than or equal to $V_Y$ (i.e., $V_f(t) \leq V_Y$) the comparator circuit can generate an output (i.e., a feedback control signal) which can be provided to and utilized by the gate driver circuit to generate a gate drive signal to turn off the low-side MOSFET.

Referring now to the figures, example aspects of the present disclosure will be discussed in greater detail.

Figure 1:
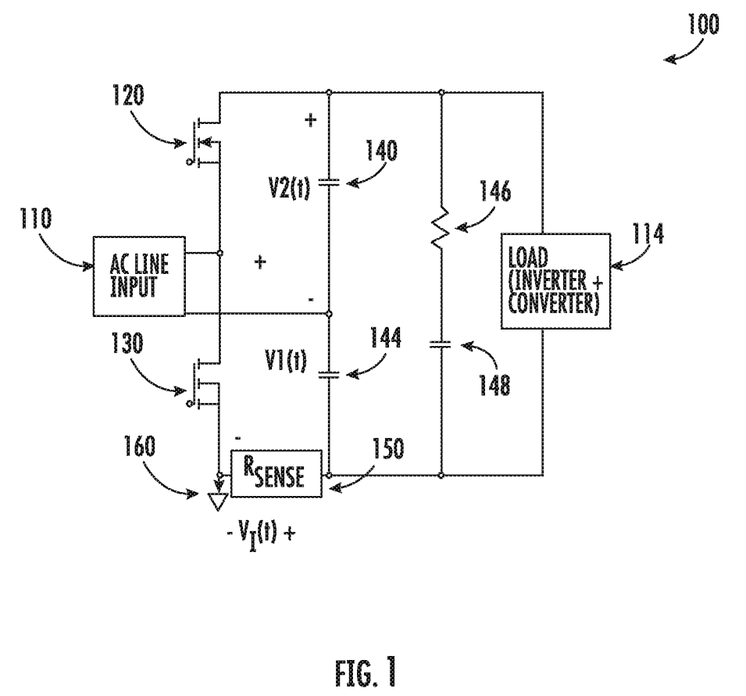
FIG. 1 depicts a circuit diagram of an example circuit topology for providing active rectification according to example embodiments of the present disclosure.

FIG. 1 depicts a circuit diagram 100 of an example circuit topology for providing active rectification according to example embodiments of the present disclosure. Circuit 100 can be configured to receive power signals from an alternating current (AC) source 110. The AC source 110 for rectification circuit 100 can be a single phase power supply, a three phase power supply, a connection to a power grid, a generator and/or any other AC power source. Circuit diagram 100 includes a high-side switching element 120 and a low-side switching element 130. High-side switching element 120 and a low-side switching element 130 can be MOSFETs, such as silicon carbide MOSFETs or gallium nitride MOSFETs. High-side switching element 120 and a low-side switching element 130 can be controlled to provide a desired rectified voltage and rectified current to a load 114. Load 114 can be any electrical system or electrical device (i.e., downstream converter or inverter) of industrial and consumer electronics and appliances, including for example, refrigerators with linear compressors, induction cooking appliances, HVAC compressors and heating elements.

Circuit 100 includes a first capacitor 140 and a second capacitor 144 which are connected in series with respect to the other and the series configuration of the first capacitor 140 and second capacitor 144 are connected to load 114 such that the first capacitor 140 and second capacitor 144 provide voltage doubling operation. More specifically, voltage doubling operation is provided via first capacitor 140 and second capacitor 144 by performing certain operations with high-side switching element 120 and low-side switching element 130. More specifically, during the positive half cycle of the sinusoidal wave of AC power input, high-side switching element 120 can be turned on and low-side switching element 130 can be turned off, so that first capacitor 140 charges through the high-side switching element 120, to the peak value of the AC sine wave or to a maximum desired rectified voltage ($V_{PEAK}$) to be provided to the load 114. During the negative half cycle of sine wave, high-side switching element 120 can be turned off and low-side switching element 130 can be turned on, so second capacitor 144 charges to $V_{PEAK}$ through low-side switching element 130.

Circuit 100 includes a resistor 146 and third capacitor 148 connected in series with respect to the other and connected in a parallel configuration with respect to load 114.

Circuit 100 includes a shunt resistor 150 (e.g., $R_{SENSE}$) that is in electrical communication with load 114 and ground 160, such that the voltage drop ($V_f(t)$) measured across the shunt resistor 150 corresponds to the rectified current flowing through the load 114. The resistance of shunt resistor 150 is selected by the designer of circuit 100 based upon the desired rectified current levels for power requirements of load 114. Circuit 100 can be utilized to obtain one or more low-side control feedback outputs. The low-side control feedback output can be used to generate a low-side gate signal to control or operate (i.e., turn on and turn off) low-side switching element 130 and cause circuit 100 to provide desired rectified voltage and rectified current conditions for power requirements of load 114. The low-side gate signal is based, at least in part, on $V_f(t)$. $V_f(t)$ represents the voltage drop across $R_{SENSE}$ 150 and corresponds to the rectified current through low-side switching element 130. The low-side gate signal is determined, at least in part, by comparing $V_f(t)$ to a low-side threshold ($V_Y$). More specifically, the parameters of determining the low-side gate signal are as follows: (1) if $V_f(t)$ is greater than $V_Y$ (i.e., $V_f(t) > V_Y$) the low-side gate signal causes low-side switching element 130 to turn on; and (2) if $V_f(t)$ is less than or equal to $V_Y$ (i.e., $V_f(t) \leq V_Y$) the low-side gate signal causes low-side switching element 130 to turn off. The low-side gate signal can be provided to the low-side switching element 130 by a low-side gate driver integrated circuit or the low-side gate signal can be provided to the low-side switching element 130 using discrete components, such as the low-side gate driver circuit 274 shown in FIG. 2. Low-side threshold ($V_Y$) is a predetermined threshold based on the desired levels of rectified voltage and rectified current for power requirements of the load. Low-side threshold ($V_Y$) can also be a threshold or boundary based upon a hysteresis tolerance or hysteresis window associated with noise related to AC source 110.

Circuit 100 can be utilized to obtain one or more high-side control feedback outputs based, at least in part, on the difference ($V_D(t)$) between the voltage ($V2(t)$) measured across first capacitor 140 and the voltage ($V1(t)$) measured from AC source 110 and ground 160. $V_D(t)$ can be determined as follows: $V_D(t) = V1(t) - V2(t)$. The high-side gate signal is determined by comparing $V_D(t)$ to a high-side threshold ($V_X$). More specifically, the parameters of high-side gate signal are as follows: (1) if $V_D(t)$ is greater than $V_X$ (i.e., $V_D(t) > V_X$) the gate signal causes high-side switching element 120 to turn on; and (2) if $V_D(t)$ is less than or equal to $V_X$ (i.e., $V_D(t) \leq V_X$) the gate signal causes high-side switching element 120 to turn off. The high-side gate signal can be provided to the high-side switching element 120 by a high-side gate driver integrated circuit or the high-side gate signal can be provided to the high-side switching element 120 using discrete components, such as the high-side gate driver circuit 284 shown in FIG. 2. High-side threshold ($V_X$) is a predetermined threshold based on the desired rectified current conditions at the load. High-side threshold ($V_X$) can also be a threshold or boundary based upon a hysteresis tolerance or hysteresis window associated with noise related to AC source 110. High-side threshold ($V_X$) and low-side threshold ($V_Y$) represent the upper and lower limits of a threshold or range based upon a hysteresis tolerance or hysteresis window associated with noise related to AC source 110.

Figure 2:
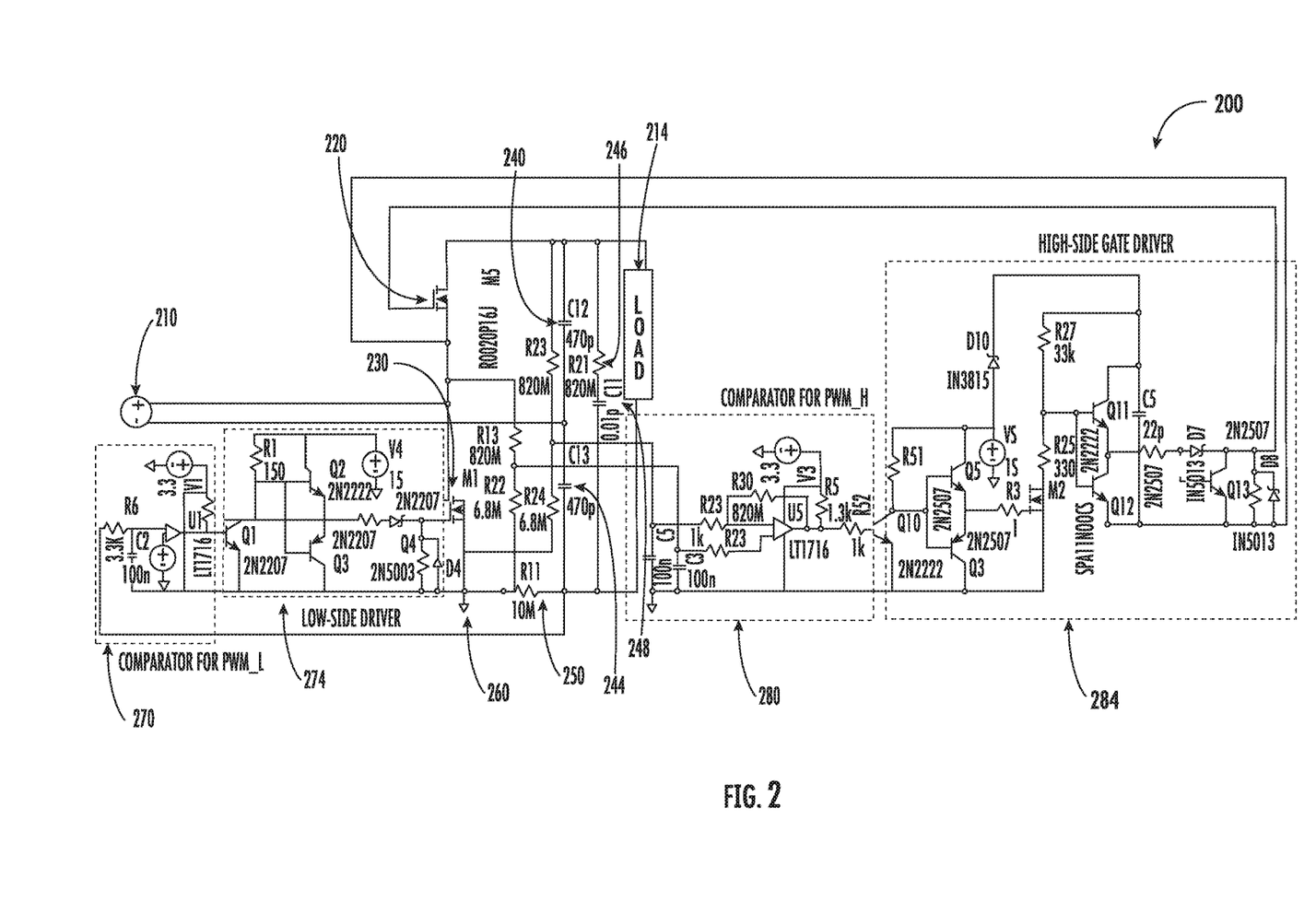
FIG. 2 depicts a power conversion system for providing self-driven active rectification according to example embodiments of the present disclosure.

FIG. 2 depicts a power conversion system 200 for providing self-driven active rectification according to example embodiments of the present disclosure. Power conversion system 200 can be configured to receive a power input from an alternating current (AC) source 210. The AC source 210 can be a single phase power supply, a three phase power supply, a connection to a power grid, a generator and/or any other AC power source. Power conversion system 200 includes a high-side switching element 220 and a low-side switching element 230. High-side switching element 220 and a low-side switching element 230 can be MOSFETs, such as silicon carbide MOSFETs or gallium nitride MOSFETs. High-side switching element 220 and a low-side switching element 230 can be controlled to provide a desired rectified voltage and rectified current, such as a desired amount of direct current or voltage, to a load 214. Load 214 can be any electrical system or electrical device (i.e., downstream converter or inverter) of industrial and consumer electronics and appliances, including for example, refrigerators with linear compressors, induction cooking appliances, HVAC compressors and heating elements.

Power conversion system 200 includes a first capacitor 240 and a second capacitor 244 which are connected in series with respect to the other. The series configuration of the first capacitor 240 and second capacitor 244 are connected to load 214 such that the first capacitor 240 and second capacitor 244 can provide voltage doubling operation. More specifically, voltage doubling operation is provided via first capacitor 240 and second capacitor 244 by performing certain operations with high-side switching element 220 and low-side switching element 230. During the positive half cycle of the sinusoidal wave of AC power, high-side switching element 220 can be turned on and low-side switching element 230 can be turned off, so that first capacitor 240 charges through the high-side switching element 220, to the peak value of the AC sine wave or to the maximum desired rectified voltage ($V_{PEAK}$) to be provided to the load. During the negative half cycle of the AC sine wave, high-side switching element 220 can be turned off and low-side switching element 230 can be turned on, so second capacitor 244 charges through low-side switching element 130 to $V_{PEAK}$.

Power conversion system 200 includes a resistor 246 and third capacitor 248 connected in series with respect to the other and connected in a parallel configuration with respect to load 214.

Power conversion system 200 includes a shunt resistor 250 (e.g., $R_{SENSE}$) that is in electrical communication with load 214 and ground 260, such that the voltage drop ($V_f(t)$) measured across the shunt resistor 250 corresponds to the rectified current flowing through the load 214 and corresponds to the current flowing through low-side switching element 230. The resistance of shunt resistor 250 is selected by the designer of power conversion system 200 based upon the desired rectified current conditions for power requirements of load 214.

Power conversion system 200 includes one of more feedback control loops. Power conversion system 200 can include a low-side feedback control loop that can be utilized to obtain one or more low-side feedback outputs and control the operation of the one or more low-side switches. Power conversion system 200 includes a high-side feedback control loop that can be utilized to obtain one or more high-side feedback outputs and control the operation of the one or more high-side switches.

Low-side feedback output ($V_f(t)$) can be used to generate a low-side gate signal to control or operate (i.e., turn on and turn off) low-side switching element 230 can cause power conversion system 200 to provide the desired rectified current conditions or other power requirements at or to load 214. Low-side gate signal is based, at least in part, on $V_f(t)$. Low-side feedback output ($V_f(t)$) represents the voltage drop across $R_{SENSE}$ and corresponds to the rectified current through low-side switching element 230.

Power conversion system 200 can be utilized to obtain one or more low-side feedback outputs. Low-side feedback output ($V_f(t)$) can be used to generate a low-side gate signal to control or operate (i.e., turn on and turn off) low-side switching element 230 can cause power conversion system 200 to provide the desired rectified current conditions or other power requirements at or to load 214. Low-side gate signal is based, at least in part, on $V_f(t)$. Low-side feedback output ($V_f(t)$) represents the voltage drop across $R_{SENSE}$ and corresponds to the rectified current through low-side switching element 230.

More specifically, a low-side feedback control signal can be determined based, at least in part, on a comparison of low-side feedback output ($V_f(t)$) to a low-side threshold ($V_Y$). Low-side feedback output (i.e., $V_f(t)$) can be provided to low-side feedback comparator circuit 270 such that the low-side feedback comparator circuit 270 generates a low-side feedback control signal. Low-side feedback control signal is determined by low-side feedback comparator circuit 270 comparing low-side feedback output ($V_f(t)$) to a low-side threshold voltage ($V_Y$). Low-side feedback comparator circuit 270 can generate a low-side feedback control signal based, at least in part, on a comparison of $V_f(t)$ to $V_Y$. The parameters for determining low-side feedback control signal can be as follows: (1) If $V_f(t)$ is greater than $V_Y$ (i.e., $V_f(t) > V_Y$) the comparator circuit 270 can generate a low-side feedback control signal (i.e., a control signal) which can be provided to and utilized by a gate driver circuit 274 to turn on the low-side switching element 230; and (2) If $V_f(t)$ is less than or equal to $V_Y$ (i.e., $V_f(t) \le V_Y$) the comparator circuit 270 can generate a low-side feedback control signal (i.e., a control signal) which can be provided to and utilized by the gate driver circuit 274 to turn off low-side switching element 230. Low-side threshold ($V_Y$) can also be a threshold or boundary based upon a hysteresis tolerance or hysteresis window associated with noise related to AC source 210.

Power converter circuit 200 can be utilized to obtain one or more high-side control feedback outputs (i.e., voltage, V2(t), measured across first capacitor 240 and the voltage, V1(t), measured from AC source 210 and ground 260). A high-side feedback control signal ($V_D(t)$) can be determined based, at least in part on the difference between the high-side control feedback outputs V2(t) and V1(t).

More specifically, high-side feedback control signal ($V_D(t)$) can be determined as follows: $V_D(t) = V1(t) - V2(t)$. The high-side feedback control signal (i.e., $V_D(t)$ can be used to generate a high-side gate signal to control or operate (i.e., turn on and turn off) high-side switching element 220 and cause power conversion system 200 to provide the desired rectified current conditions for power requirements of load 214.

More specifically, a high-side gate signal is determined by comparing $V_D(t)$ to a high-side threshold $(V_X)$. The high-side feedback control signal $(V_D(t))$ can be provided to high-side feedback comparator circuit 280 such that the high-side feedback comparator circuit 280 generates a high-side gate signal. More specifically, the parameters of high-side gate signal can be as follows: (1) If $V_D(t)$ is greater than $V_X$ (i.e., $V_D(t) > V_X$) the gate signal causes high-side switching element 220 to turn on; and (2) If $V_D(t)$ is less than or equal to $V_X$ (i.e., $V_D(t) \leq V_X$) the gate signal causes high-side switching element 220 to turn off. The high-side gate signal can be provided to the high-side switching element 220 by a high-side gate driver integrated circuit or the high-side gate signal can be provided to the high-side switching element 220 using discrete components, such as the high-side gate driver circuit 284. High-side threshold $(V_X)$ is a predetermined threshold based on the desired rectified current conditions at the load. High-side threshold $(V_X)$ can also be a threshold or boundary based upon a hysteresis tolerance or hysteresis window associated with noise related to AC source 210. High-side threshold $(V_X)$ and low-side threshold $(V_Y)$ represent the upper and lower limits of a threshold or range based upon a hysteresis tolerance or hysteresis window associated with noise related to AC source 210.

Figure 3:
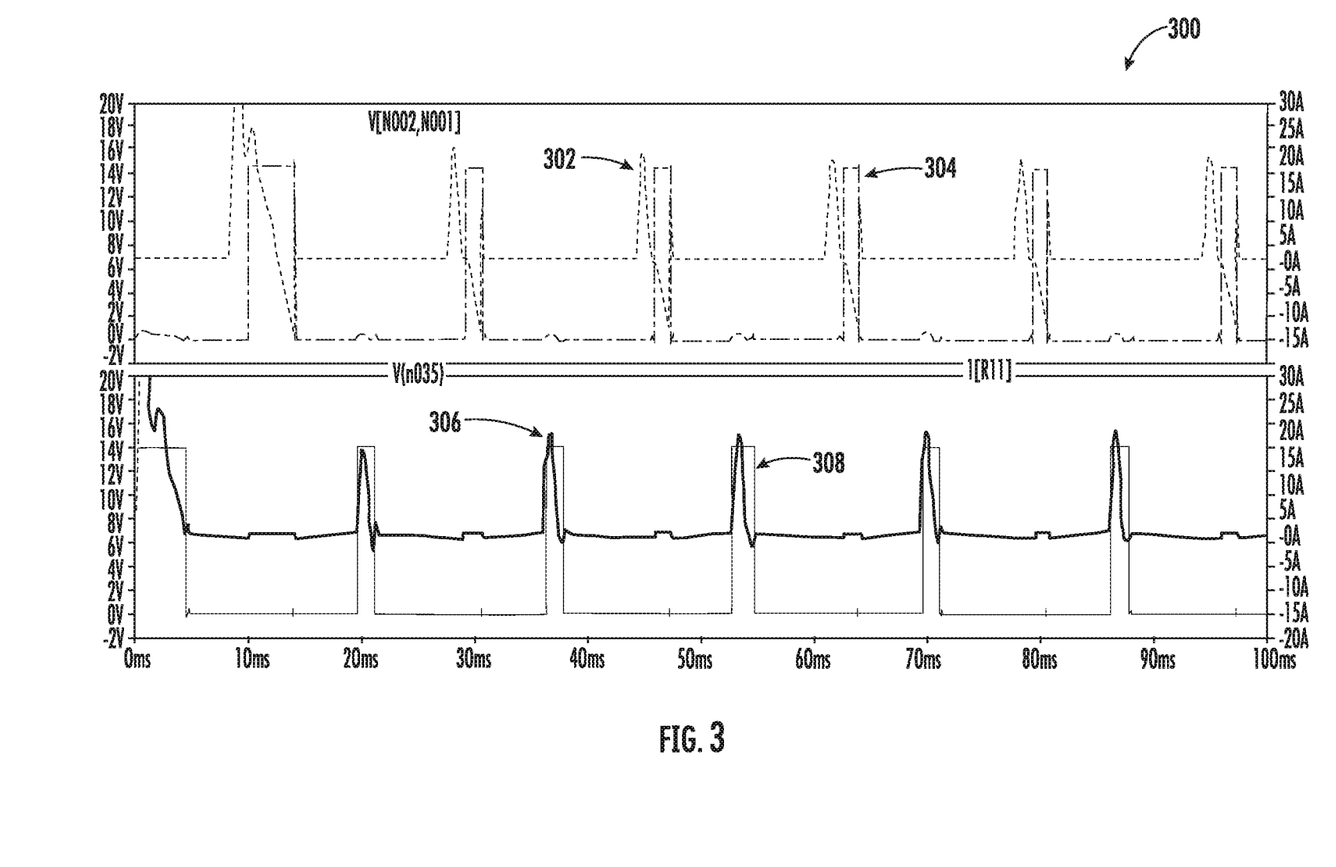
FIG. 3 is a graphical depiction of the relationship of the voltage and current over a period of time at the MOSFETs depicted in the circuit diagram for the power converter shown in FIG. 2.

FIG. 3 is a graphical depiction 300 of the relationship of the voltage and current over a period of time at the MOSFETs shown in FIG. 2. The upper half of graphical depiction 300 represents the current and voltage at high-side switching element 220 (shown in FIG. 2) over a period of time. Signal 302 demonstrates the current flowing through high-side switching element 220 over a period of time. Signal 304 demonstrates the gate voltage of high-side switching element 220 over the same period of time.

The lower half of graphical depiction 300 represents the current and voltage at low-side switching element 230 (shown in FIG. 2) over a period of time. Signal 306 demonstrates the current flowing through low-side switching element 230 over a period of time. Signal 308 demonstrates the gate voltage of low-side switching element over the same period of time.

Figure 4:
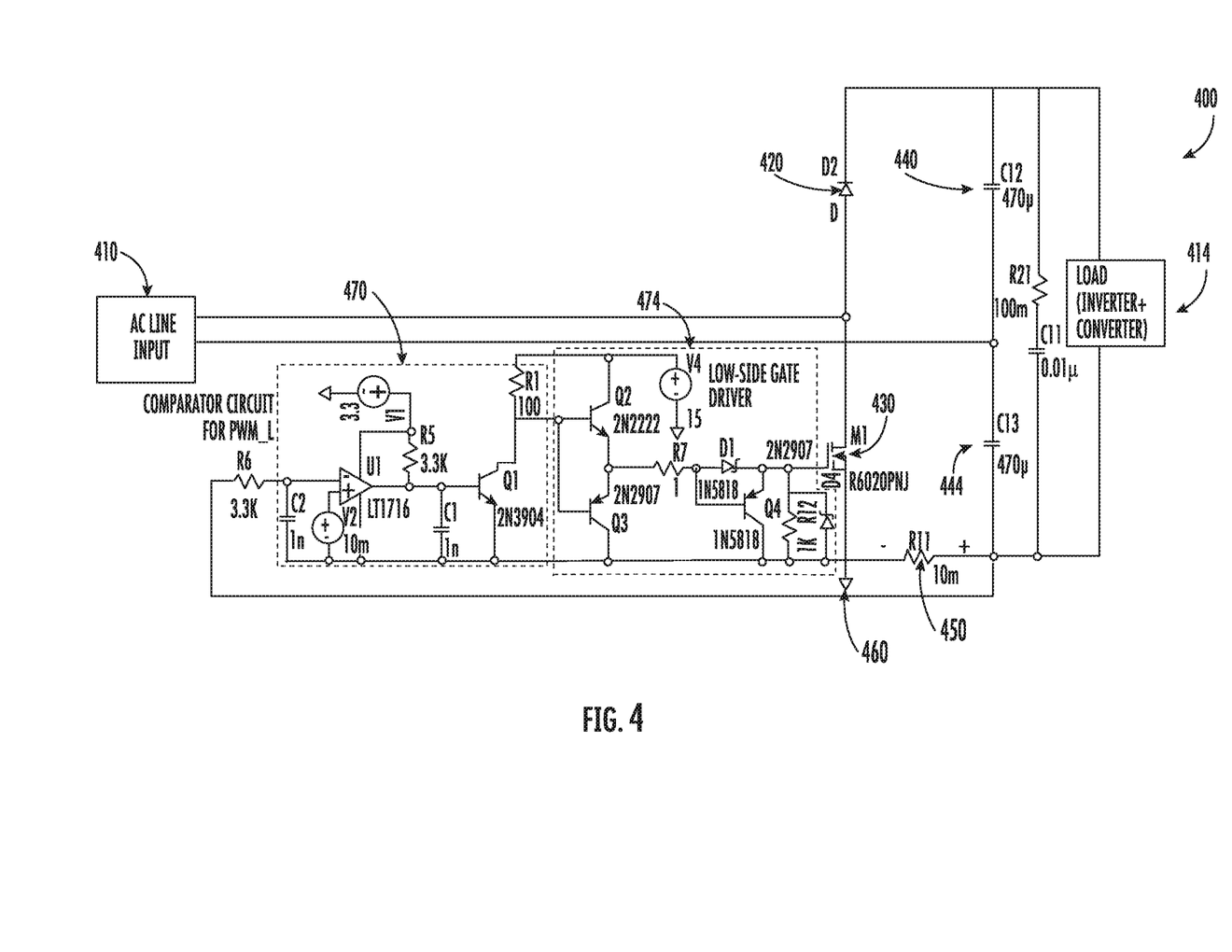
FIG. 4 depicts a circuit diagram of an example circuit topology for a hybrid power converter providing self-driven active rectification according to an example embodiment of the present disclosure.

FIG. 4 depicts a circuit diagram 400 of an example circuit topology for a hybrid power converter providing self-driven active rectification according to an example embodiment of the present disclosure. Circuit 400 can be configured to receive power signals from an alternating current (AC) source 410. The AC source 410 for rectification circuit 400 can be a single phase power supply, a three phase power supply, a connection to a power grid, a generator and/or any other AC power source. Circuit diagram 400 includes a high-side diode 420 and a low-side switching element 430. Use of a diode on the high-side in the topology for circuit 400 can provide a benefit of a more streamlined and cost effective circuit topology. Low-side switching element 430 can be a MOSFET, such as a silicon carbide MOSFET or gallium nitride MOSFET. Low-side switching element 430 can be controlled to provide a desired levels of rectified voltage and rectified current for a load 414. Load 414 can be any electrical system or electrical device such as downstream converters and/or inverters.

Circuit 400 includes a first capacitor 440 and a second capacitor 444 which are connected in series with respect to the other. The series configuration of the first capacitor 440 and second capacitor 444 are connected to load 414 such that the first capacitor 440 and second capacitor 444 to provide voltage doubling operation. More specifically, voltage doubling operation is provided via first capacitor 440 and second capacitor 444 by performing certain operations with high-side diode 420 and low-side switching element 430. More specifically, during the positive half cycle of the sinusoidal wave of AC power, high-side diode 420 allows current to flow through high-side diode 420 and low-side switching element 430 can be turned off, so that first capacitor 440 charges through the high-side diode 420, to the peak value of the AC sine wave or to the maximum desired rectified voltage to be provided to the load $(V_{PEAK})$. During the negative half cycle of AC input sine wave, high-side diode 420 blocks current flow through first capacitor 140 and low-side switching element 430 can be turned on, so second capacitor 444 charges through low-side switching element 130, to $V_{PEAK}$.

Power converter circuit 400 includes a shunt resistor 450 (e.g., $R_{SENSE}$) that is in electrical communication with load 414 and ground 460, such that the voltage drop $(V_f(t))$ measured across the shunt resistor 450 corresponds to the rectified current flowing through the load 414. The resistance of shunt resistor 450 is selected by the designer of circuit 400 based upon the desired rectified current conditions for power requirements of load 414.

Power converter circuit 400 can be utilized to obtain one or more low-side feedback outputs. Low-side feedback output $(V_f(t))$ can be used to generate a low-side gate signal to control or operate (i.e., turn on and turn off) low-side switching element 430 and cause circuit 400 to provide the desired rectified current conditions at or power requirements of load 414. Low-side gate signal is based, at least in part, on $V_f(t)$. Low-side feedback output $(V_f(t))$ represents the voltage drop across shunt resistor 450 and corresponds to the rectified current through low-side switching element 430.

More specifically, a low-side feedback signal output can be determined based, at least in part, on a comparison of low-side feedback output $(V_f(t))$ to a low-side threshold $(V_Y)$. Low-side feedback output (i.e., $V_f(t)$) can be provided to low-side feedback comparator circuit 470 such that the low-side feedback comparator circuit 470 generates a low-side feedback control signal. Comparator circuit 470 can be an integrated circuit (e.g., a LT1716 comparator) or a number of discrete elements as depicted in FIG. 4. In certain embodiments when the voltage $(V_f(t))$ across the shunt resistor 450 is low, due to either a low electrical resistance of shunt resistor 450 or low current through shunt resistor 450, an amplifier circuit can be implemented between shunt resistor 450 and low-side feedback comparator circuit 470, such that $V_f(t)$ is amplified before being provided to comparator circuit 470.

Low-side feedback control signal is determined by low-side feedback comparator circuit 470 comparing low-side feedback output $(V_f(t))$ to a low-side threshold voltage $(V_Y)$. Low-side feedback comparator circuit 470 can generate a low-side feedback control signal based, at least in part, on a comparison of $V_f(t)$ to $V_Y$. The parameters for determining low-side feedback control signal can be as follows: (1) If $V_f(t)$ is greater than $V_Y$ (i.e., $V_f(t) > V_Y$) the comparator circuit 470 can generate a low-side feedback control signal (i.e., a control signal) which can be provided to and utilized by a gate driver circuit 474 to turn on the low-side switching element 430; and (2) If $V_f(t)$ is less than or equal to $V_Y$ (i.e., $V_f(t) \leq V_Y$) the comparator circuit 470 can generate a low-side feedback control signal (i.e., a control signal) which can be provided to and utilized by the gate driver circuit 274 to turn off low-side switching element 430. Low-side threshold $(V_Y)$ can also be a threshold or boundary based upon a hysteresis tolerance or hysteresis window associated with noise related to AC source 410.

Figure 5:
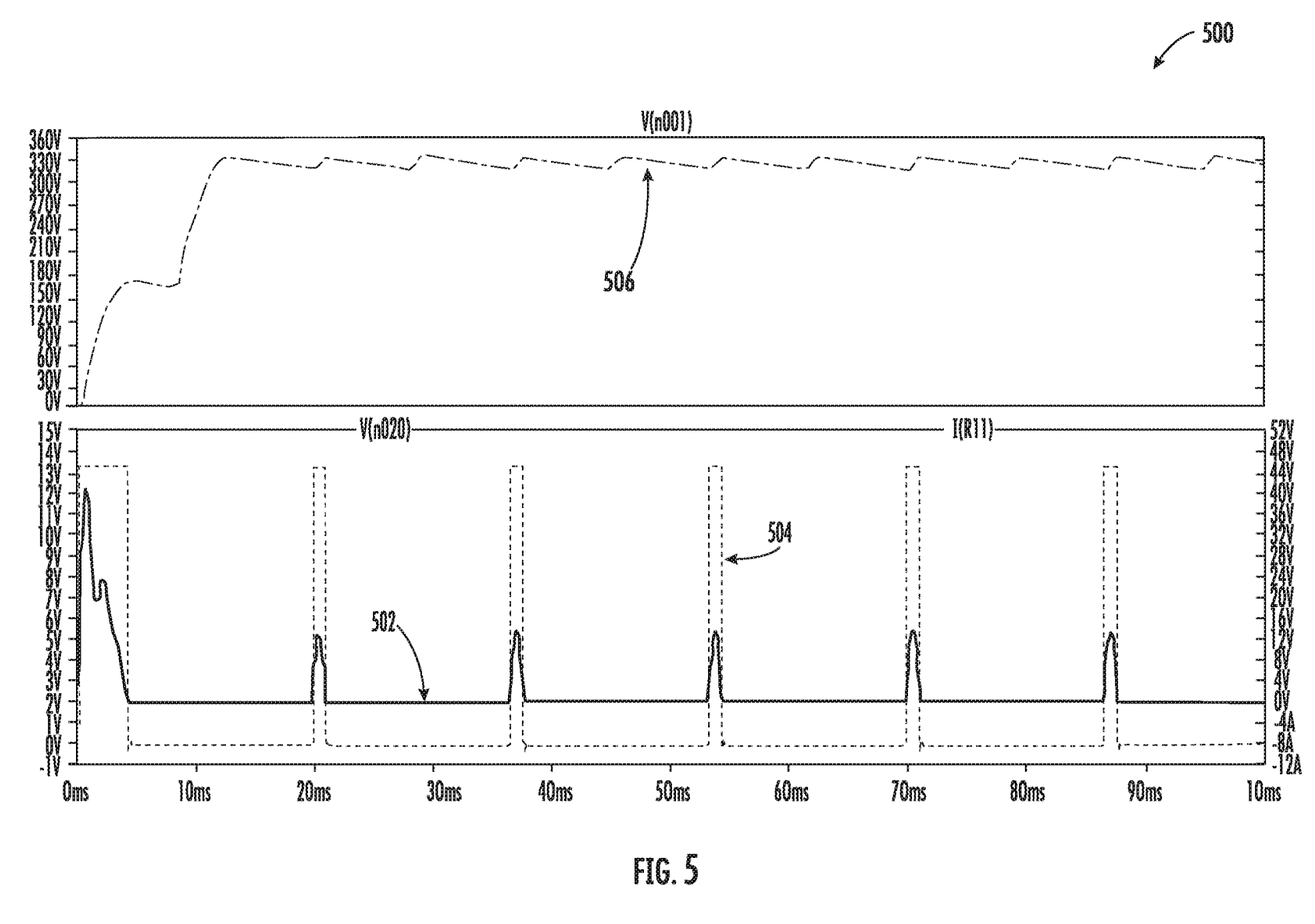
FIG. 5 is a graphical depiction of the relationship of the voltage and current over a period of time at the low-side MOSFET depicted in the circuit topology for the power converter shown in FIG. 4.

FIG. 5 is a graphical depiction 500 of the relationship of the voltage and current over a period of time at the low-side MOSFETs depicted in the circuit topology for the power converter shown in FIG. 4. The upper half of graphical depiction 500 represents the rectified AC voltage which is the input of load 414 (shown in FIG. 4) over a period of time. In this regard signal 506 represents the rectified voltage at load 414.

The lower half of graphical depiction 500 represents the current and voltage at low-side switching element 430 (shown in FIG. 4) over a period of time. Signal 502 demonstrates the current flowing through low-side switching element 430 over a period of time. Signal 503 demonstrates the gate voltage of low-side switching element over the same period of time.

Figure 6:
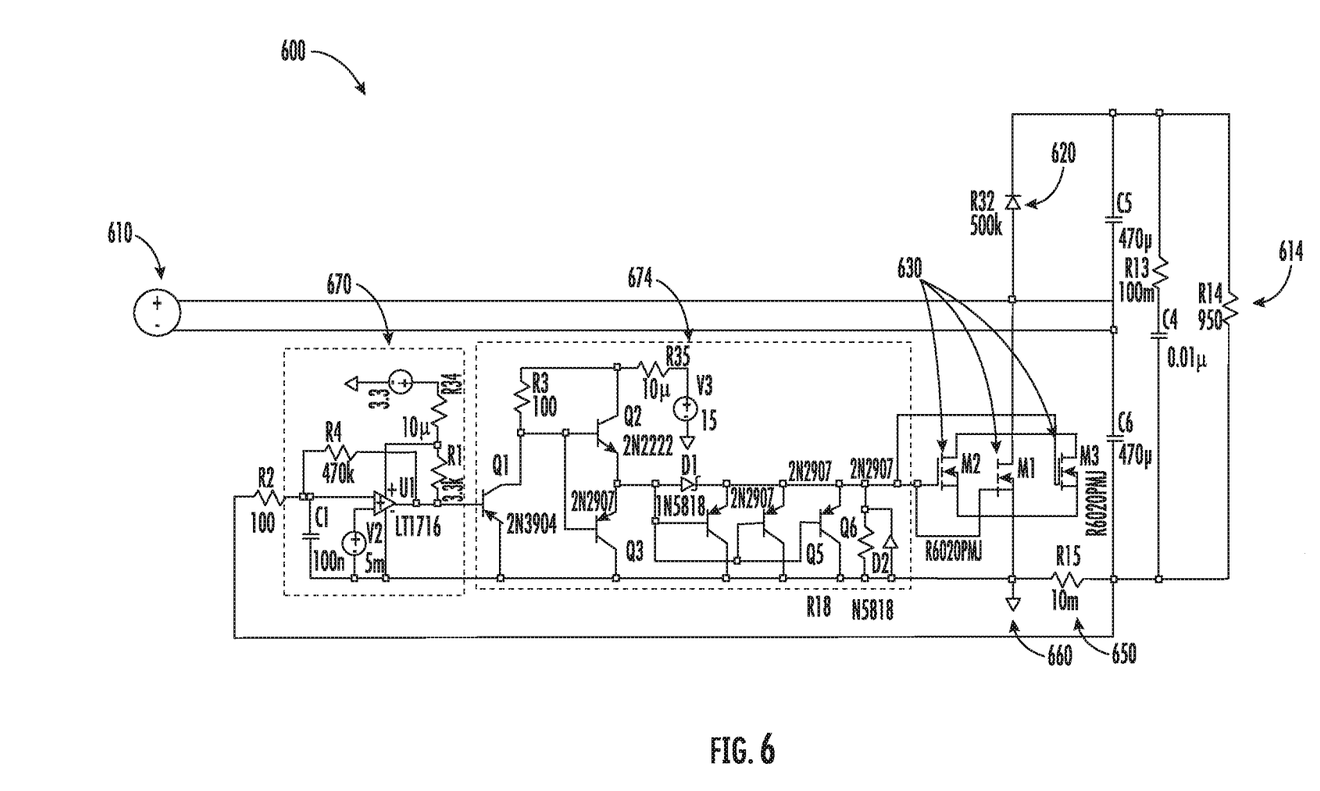
FIG. 6 depicts a circuit diagram of an example circuit topology for a hybrid power converter with a plurality of low-side switching elements providing self-driven active rectification according to an example embodiment of the present disclosure.

FIG. 6 depicts a circuit diagram 600 of an example circuit topology for a hybrid power converter with multiple low-side switching elements providing self-driven active rectification according to an example embodiment of the present disclosure. Circuit 600 can be configured to receive power signals from an alternating current (AC) source 610. Circuit diagram 600 includes a high-side diode 620 and a plurality of low-side switching elements 630 connected in parallel. Use of multiple low-side switching elements connected in parallel can provide a benefit of reduced conduction losses through the multiple switches as compared to a single switching element or diode. Use of a diode on the high-side in the topology for circuit 600 can provide a benefit of a more streamlined and cost effective circuit topology. Low-side switching elements 630 can be a MOSFET, such as a silicon carbide MOSFET or gallium nitride MOSFET. Low-side switching elements 630 can be controlled to provide a desired level of rectified voltage and rectified current to a load 614.

Power converter circuit 600 includes a shunt resistor 650 (e.g., $R_{SENSE}$) that is in electrical communication with load 614 and ground 660, such that the voltage drop ($V_f(t)$) measured across the shunt resistor 650 corresponds to the rectified current flowing through the load 614. The resistance of shunt resistor 650 is selected by the designer of circuit 600 based upon the desired rectified current conditions for power requirements of load 614.

The plurality of low-side switching elements 630 are controlled in a manner similar to that described with respect to the power converter depicted in FIG. 4. More specifically, power converter circuit 600 can be utilized to obtain one or more low-side feedback outputs. Low-side feedback output ($V_f(t)$) can be used to generate a low-side gate signal to control or operate (i.e., turn on and turn off) the plurality of low-side switching elements 630 and cause circuit 600 to provide the desired rectified current conditions for power requirements of load 614. Low-side gate signal is based, at least in part, on $V_f(t)$. Low-side feedback output ($V_f(t)$) represents the voltage drop across shunt resistor 650 and corresponds to the rectified current through the plurality of low-side switching elements 630.

Power converter circuit 600 can be utilized to obtain one or more low-side feedback outputs. Low-side feedback output ($V_f(t)$) can be used to generate a low-side gate signal to control or operate (i.e., turn on and turn off) low-side switching element 630 and cause circuit 600 to provide the desired rectified current conditions at or power requirements of load 614. Low-side gate signal is based, at least in part, on $V_f(t)$. Low-side feedback output ($V_f(t)$) represents the voltage drop across shunt resistor 650 and corresponds to the rectified current through the plurality of low-side switching element 630.

More specifically, a low-side feedback signal output can be determined based, at least in part, on a comparison of low-side feedback output ($V_f(t)$) to a low-side threshold ($V_Y$). Low-side feedback output (i.e., $V_f(t)$) can be provided to low-side feedback comparator circuit 670 such that the low-side feedback comparator circuit 670 generates a low-side feedback control signal. Comparator circuit 670 can be an integrated circuit (e.g., an LT1716 comparator) or a number of discrete elements as depicted in FIG. 6. In certain embodiments when the voltage ($V_f(t)$ across the shunt resistor 650 is low, due to either a low electrical resistance of shunt resistor 650 or low current through shunt resistor 650, an amplifier circuit can be implemented between shunt resistor 650 and low-side feedback comparator circuit 670, such that $V_f(t)$ is amplified before being provided to comparator circuit 670.

Low-side feedback control signal is determined by low-side feedback comparator circuit 670 comparing low-side feedback output ($V_f(t)$) to a low-side threshold voltage ($V_Y$). Low-side feedback comparator circuit 670 can generate a low-side feedback control signal based, at least in part, on a comparison of $V_f(t)$ to $V_Y$. The parameters for determining low-side feedback control signal can be as follows: (1) If $V_f(t)$ is greater than $V_Y$ (i.e., $V_f(t) > V_Y$) the comparator circuit 470 can generate a low-side feedback control signal (i.e., a control signal) which can be provided to and utilized by a gate driver circuit 674 to turn on the plurality of low-side switching elements 630; and (2) If $V_f(t)$ is less than or equal to $V_Y$ (i.e., $V_f(t) \leq V_Y$) the comparator circuit 670 can generate a low-side feedback control signal (i.e., a control signal) which can be provided to and utilized by the gate driver circuit 674 to turn off the plurality of low-side switching elements 630. Low-side threshold ($V_Y$) can also be a threshold or boundary based upon a hysteresis tolerance or hysteresis window associated with noise related to AC source 610.

Figure 7:
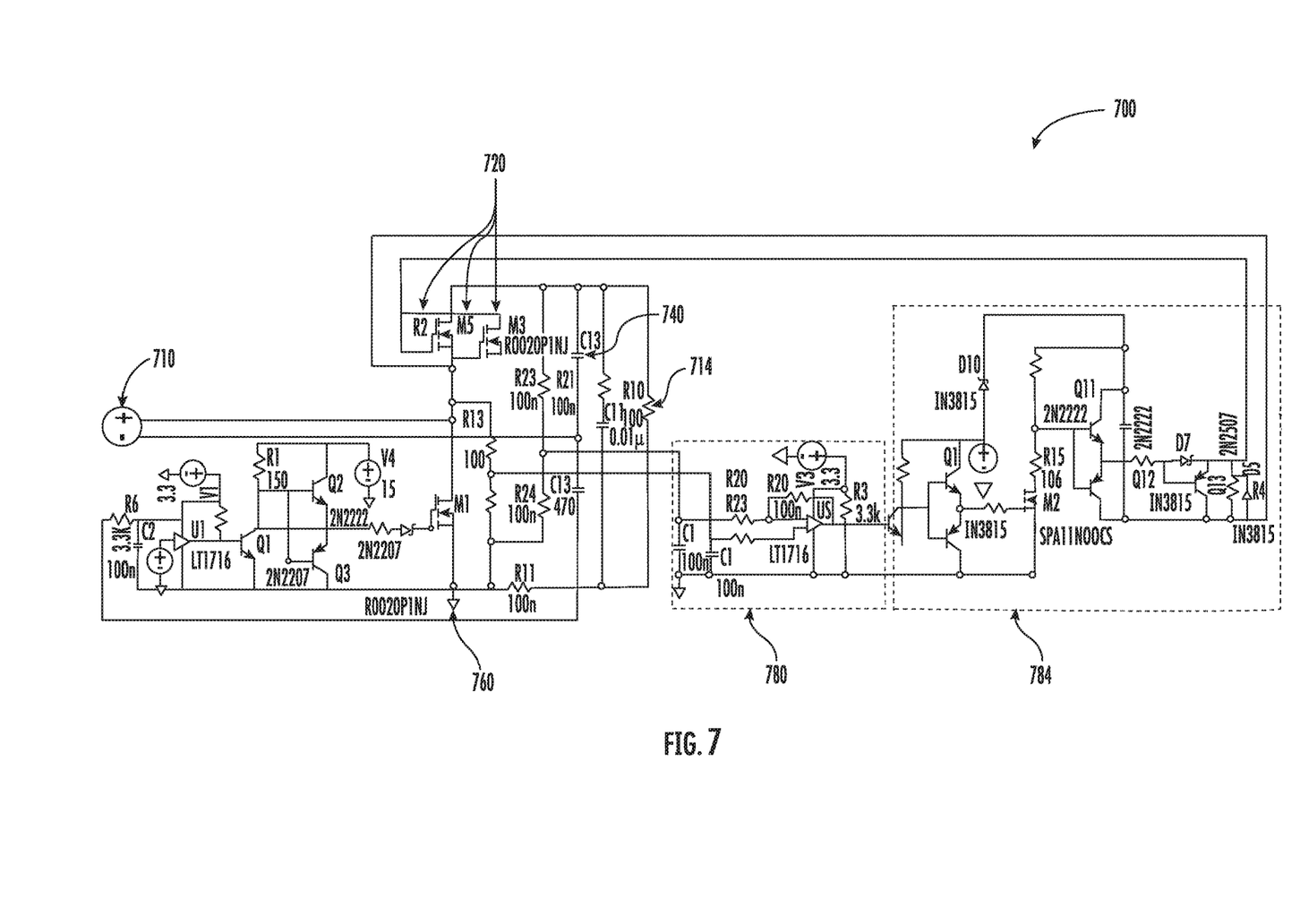
FIG. 7 depicts a circuit diagram of an example circuit topology for a power converter for providing self-driven active rectification with a plurality of high-side switching elements according to example embodiments of the present disclosure.

FIG. 7 depicts a circuit diagram 700 of an example circuit topology for a hybrid power converter with multiple high-side switching elements providing self-driven active rectification according to an example embodiment of the present disclosure. Circuit 700 can be configured to receive power signals from an alternating current (AC) source 710. Circuit diagram 700 includes a plurality of high-side switching elements 720 connected in parallel. Use of multiple high-side switching elements connect in parallel can provide a benefit of reduced conduction losses through the multiple switches as compared to a single switching element or diode. High-side switching elements 720 can be a MOSFET, such as a silicon carbide MOSFET or gallium nitride MOSFET.

Power converter circuit 700 can be utilized to obtain one or more high-side control feedback outputs (i.e., voltage, $V2(t)$, measured across first capacitor 740 and the voltage, $V1(t)$, measured from AC source 710 and ground 760). A high-side feedback control signal ($V_D(t)$) can be determined based, at least in part, on the difference between the high-side control feedback outputs $V2(t)$ and $V1(t)$.

More specifically, high-side feedback control signal ($V_D(t)$) can be determined as follows: $V_D(t) = V1(t) - V2(t)$. The high-side feedback control signal (i.e., $V_D(t)$) can be used to generate a high-side gate signal to control or operate (i.e., turn on and turn off) the plurality of high-side switching elements 720 and cause circuit 700 to provide the desired rectified current conditions for power requirements of load 714.

More specifically, a high-side gate signal is determined by comparing $V_D(t)$ to a high-side threshold $(V_X)$. The high-side feedback control signal $(V_D(t))$ can be provided to high-side feedback comparator circuit 780 such that the high-side feedback comparator circuit 780 generates a high-side gate signal. More specifically, the parameters of high-side gate signal are as follows: (1) If $V_D(t)$ is greater than $V_X$ (i.e., $V_D(t)>V_X$) the gate signal causes the plurality of high-side switching elements 720 to turn on; and (2) If $V_D(t)$ is less than or equal to $V_X$ (i.e., $V_D(t) \leq V_X$) the gate signal causes the plurality of high-side switching elements 720 to turn off. The high-side gate signal can be provided to the high-side switching element 220 by a high-side gate driver integrated circuit or the high-side gate signal can be provided to the plurality of high-side switching elements 720 using discrete components, such as the high-side gate driver circuit 784. High-side threshold $(V_X)$ is a predetermined threshold based on the desired rectified current conditions at the load. High-side threshold $(V_X)$ can also be a threshold or boundary based upon a hysteresis tolerance or hysteresis window associated with noise related to AC source 710. High-side threshold $(V_X)$ and low-side threshold $(V_Y)$ represent the upper and lower limits of a threshold or range based upon a hysteresis tolerance or hysteresis window associated with noise related to AC source 710.

Figure 8:
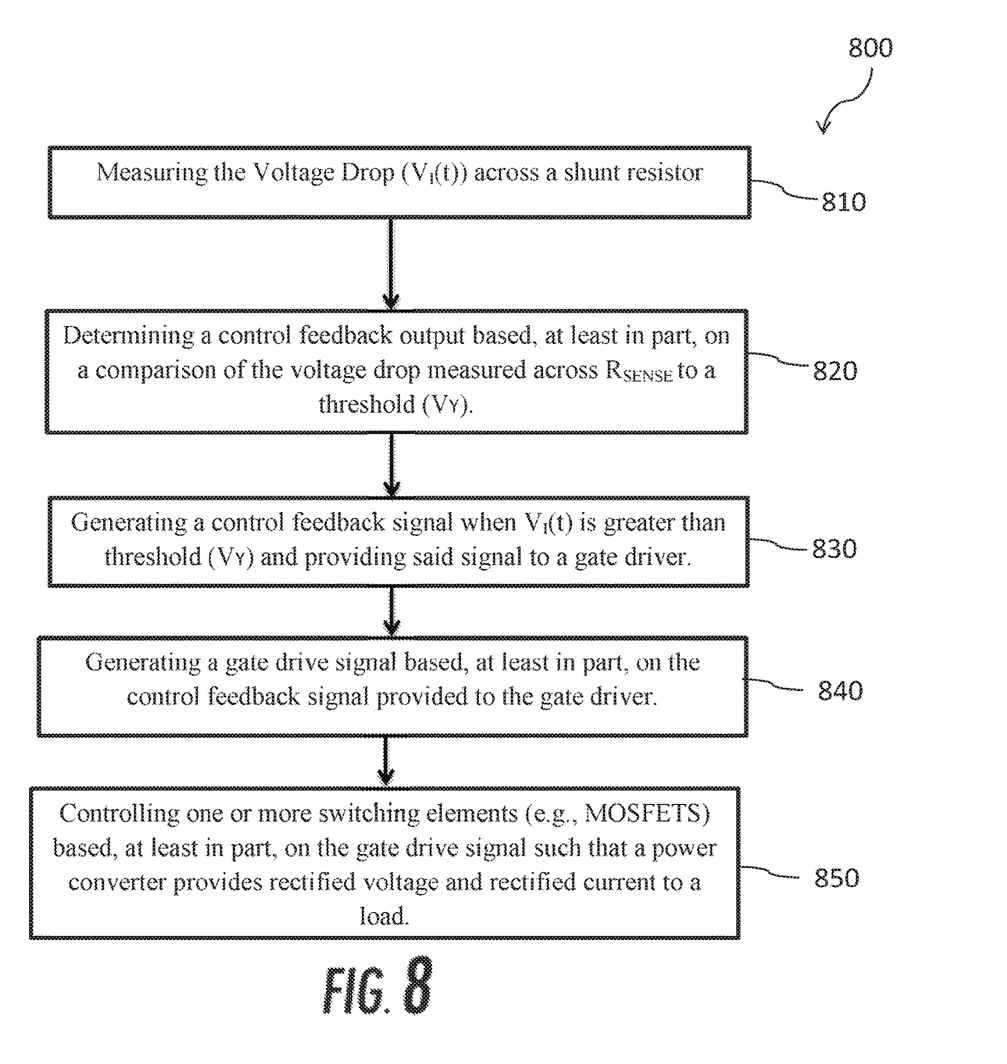
FIG. 8 depicts a flow chart of a portion of an example method for providing self-driven active rectification according to an example embodiment of the present disclosure.

FIG. 8 depicts a flow chart of a portion of an example method 800 for providing self-driven active rectification according to an example embodiment of the present disclosure. Method 800 can be performed utilizing one or more power converter circuits for AC rectification, said power converter circuits having one or more low-side switching elements (e.g., MOSFETs), a shunt resistor (e.g., $R_{SENSE}$), such as shunt resistor 450 in FIG. 4., that is in electrical communication with a load and a ground, such as shown in the circuits depicted in FIGS. 1, 2, 4, 6 and 7.

At (810) the method can include measuring the voltage drop across $R_{SENSE}$, for example, by using a control feedback circuit.

At (820) the method can include determining a control feedback output based, at least in part, on the voltage drop measured across $R_{SENSE}$. Control feedback output can be determined by a control feedback circuit. The control feedback circuit (e.g., a comparator circuit) can generate the control feedback output based, at least in part, on a comparison of $V_f(t)$ to $V_Y$.

At (830) the method can include generating a control feedback signal when $V_f(t)$ is greater than $V_Y$ (i.e., $V_f(t)>V_Y$) at (820) and the comparator circuit providing the control feedback signal to a gate driver circuit to turn on one or more switching elements. If $V_f(t)$ is less than or equal to $V_Y$ (i.e., $V_f(t) \leq V_Y$) the comparator circuit can provide a control feedback signal which can be provided to and utilized by the gate driver circuit to turn off one or more switching elements (i.e., low-side MOSFETs).

At (840) the method can include generating a gate drive signal based, at least in part, on the control feedback signal.

At (850) the method can include operating or controlling one or more switching elements (e.g. MOSFETs) utilizing and/or based upon the gate drive signal (i.e., to control, drive or operate, e.g., turn on and turn off, one or more low-side MOSFETs). The gate drive signal can be used to control or operate the one or more switching elements (e.g., low-side MOSFETs) in such a manner as to cause the rectifier circuit or power converter to provide rectified voltage and rectified current to the load. In this way, the control method can be used to control or operate a power converter such that the power converter has a technical effect of providing AC rectification, utilizing streamlined and cost effective circuit topologies, with reduced conduction losses as a result of the use of MOSFETs.

Although specific features of various embodiments may be shown in some drawings and not in others, this is for convenience only. In accordance with the principles of the present disclosure, any feature of a drawing can be referenced and/or claimed in combination with any feature of any other drawing.

This written description uses examples for the disclosure, including the best mode, and also to enable any person skilled in the art to practice the disclosure, including making and using any devices or systems and performing any incorporated methods. The patentable scope of the disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A power conversion system for providing self-driven active AC rectification, the power conversion system comprising:
    an input for receiving AC power;
    a first capacitor and a second capacitor electrically connected in series, said first and second capacitors being electrically connected in parallel with a load;
    a low-side switching element;
    a shunt resistor electrically connected between the load and a power conversion system ground;
    a low-side feedback control loop configured to provide a low-side feedback signal based, at least in part, on a voltage across the shunt resistor;
    the low-side feedback control loop being further configured to control the low-side switching element based, at least in part, on the low-side feedback signal;
    a high-side switching element;
    a high-side feedback control loop configured to provide a high-side feedback signal based, at least in part, on a comparison of a voltage measured across the first capacitor and a voltage measured between the input for receiving AC power and the power conversion system ground; and
    the high-side feedback control loop being further configured to control the high-side switching element based, at least in part, on the high-side feedback signal.

2. The power conversion system of claim 1, wherein the low-side feedback control loop comprises a comparator circuit configured to generate a low-side feedback control signal based, at least in part, on a comparison of the low-side feedback signal to a low-side threshold.

3. The power conversion system of claim 2, wherein the low-side threshold is associated with a hysteresis tolerance related to the AC power.

4. The power conversion system of claim 2, wherein the low-side feedback control loop further comprises a gate driver circuit configured to generate a gate drive signal and control the operation of the low-side switching element based, at least in part, on the low-side feedback control signal.

5. The power conversion system of claim 4, wherein the low-side switching element comprises a MOSFET.

6. The power conversion system of claim 4, wherein the low-side switching element comprises a plurality of MOSFETs electrically connected in parallel.

7. The power conversion system of claim 1, wherein the high-side feedback control loop comprises a comparator circuit configured to generate a high-side feedback control signal based, at least in part, on a comparison of the high-side feedback signal to a high-side threshold.

8. The power conversion system of claim 7, wherein the high-side threshold is associated with the hysteresis tolerance related to the AC power.

9. The power conversion system of claim 8, wherein the high-side feedback control loop further comprises a gate driver circuit configured to generate a gate drive signal and control the operation of the high-side switching element based, at least in part, on the high-side feedback control signal.

10. The power conversion system of claim 9, wherein the high-side switching element comprises a MOSFET.

11. The power conversion system of claim 9, wherein the high-side switching element comprises a plurality of MOSFETs electrically connected in parallel.

12. A self-driven active rectifier circuit, said circuit comprising:
    an input configured for receiving AC power;
    a first capacitor and a second capacitor electrically connected in series;
    a high-side diode;
    a low-side switching element;
    a shunt resistor electrically connected between a load and a rectifier circuit ground;
    a low-side feedback control loop configured to provide a low-side feedback signal based, at least in part, on a voltage across the shunt resistor;
    the low-side feedback control loop being further configured to control the low-side switching element based, at least in part, on the low-side feedback signal;
    a high-side switching element;
    a high-side feedback control loop configured to provide a high-side feedback signal based, at least in part, on a comparison of a voltage measured across the first capacitor and a voltage measured between the input for receiving AC power and the power conversion system ground; and
    the high-side feedback control loop being further configured to control the high-side switching element based, at least in part, on the high-side feedback signal.

13. The rectifier circuit of claim 12, wherein the low-side feedback control loop comprises a comparator circuit configured to generate a low-side feedback control signal based, at least in part, on a comparison of the low-side feedback signal based on a voltage across the shunt resistor to a low-side threshold.

14. The rectifier circuit of claim 13, wherein the low-side feedback control loop further comprises a gate driver circuit configured to generate a gate drive signal and control the operation of the low-side switching element based, at least in part, on the low-side feedback control signal.

15. The power conversion system of claim 14, wherein the low-side switching element comprises a MOSFET.

16. The power conversion system of claim 14, wherein the low-side switching element comprises a plurality of MOSFETs electrically connected in parallel.

17. A method for providing self-driven active rectification to convert AC line input to rectified output, the method comprising:
    measuring a voltage across a shunt resistor, said shunt resistor being electrically connected between a rectifier's load and a ground;
    determining a feedback signal based, at least in part, on a comparison of the voltage measured across the shunt resistor to a threshold;
    generating a control signal when the feedback signal is greater than the threshold;
    providing the control signal to a gate driver;
    generating a gate drive signal based at least in part on the control signal;
    controlling one or more low-side switching elements based, at least in part, on the gate drive signal;
    measuring a voltage across a first capacitor;
    measuring a voltage between an input for receiving AC power and a ground;
    determining a high-side feedback signal based, at least in part, on a comparison of the voltage measured across the first capacitor and the voltage measured between the input for receiving AC power and the ground;
    generating a high-side control signal based, at least in part, on a comparison of the voltage measured across the first capacitor and the voltage measured between the input for receiving AC power and the ground;
    providing the high-side control signal to a high-side gate driver;
    generating a high-side gate drive signal based at least in part on the high-side control signal; and
    controlling one or more high-side switching elements based, at least in part, on the gate drive signal.

18. The method of claim 17 further comprising:
    comparing the high-side feedback signal to a high-side threshold; and
    generating the high-side control signal when the high-side feedback signal is greater than the high-side threshold.

19. The method of claim 17, wherein the low-side switching element comprises a plurality of MOSFETs electrically connected in parallel.

* * * * *